(12) United States Patent
Rodriguez et al.

(10) Patent No.: US 11,934,403 B2
(45) Date of Patent: Mar. 19, 2024

(54) GENERATING TRAINING DATA FOR NATURAL LANGUAGE SEARCH SYSTEMS

(71) Applicant: Salesforce, Inc., San Francisco, CA (US)

(72) Inventors: Mario Sergio Rodriguez, Santa Clara, CA (US); Arvind Srikantan, San Mateo, CA (US); Ahmet Bugdayci, Los Altos, CA (US)

(73) Assignee: Salesforce, Inc., San Francisco, CA (US)

( * ) Notice: Subject to any disclaimer, the term of this patent is extended or adjusted under 35 U.S.C. 154(b) by 160 days.

(21) Appl. No.: 16/876,755

(22) Filed: May 18, 2020

(65) Prior Publication Data
US 2021/0357409 A1   Nov. 18, 2021

(51) Int. Cl.
*G06F 16/2455*   (2019.01)
*G06F 16/242*   (2019.01)
*G06F 40/295*   (2020.01)
*G06F 40/30*   (2020.01)
(Continued)

(52) U.S. Cl.
CPC .... *G06F 16/24553* (2019.01); *G06F 16/2433* (2019.01); *G06F 40/295* (2020.01); *G06F 40/30* (2020.01); *G06F 40/40* (2020.01); *G06N 20/00* (2019.01)

(58) Field of Classification Search
CPC .............. G06Q 30/0256; G06F 16/248; G06F 16/24575; G06F 16/24522; G06F 40/30; G06F 16/243; G06F 16/2433; G06F 40/253; G06F 40/295; G06F 40/40; G06F 16/3344; G06F 40/44; G06F 16/24553; G06F 40/157; G06F 40/216; G06N 20/00
See application file for complete search history.

(56) References Cited

U.S. PATENT DOCUMENTS 5,457,768 A  * 10/1995  Tsuboi ............... G10L 15/18
                                                            704/219
5,577,188 A     11/1996  Zhu
5,608,872 A      3/1997  Schwartz et al.
(Continued)

FOREIGN PATENT DOCUMENTS

WO    WO-0129823 A1 *  4/2001  ............ G10L 15/22

OTHER PUBLICATIONS

"Bidirectional LSTM-CRF and ELMo for Named-Entity Recognition, Part-of-Speech Tagging and so on", https://github.com/Hironsan/anago, Downloaded Apr. 27, 2020, 5 pages.
(Continued)

*Primary Examiner* — Yuk Ting Choi
(74) *Attorney, Agent, or Firm* — Kwan & Olynick LLP

(57) ABSTRACT

System and methods are described for generating training data for a natural language search system, the training data including synthetic user queries and associated structured query language (SQL) statements. A method includes generating an abstract query representation from a probabilistic context-free grammar (PCFG), selecting a sample record from a database using the abstract query representation, generating a tagged user query from the abstract query representation and the sample record, and generating the one or more SQL statements from the tagged user query and one or more SQL templates.

10 Claims, 13 Drawing Sheets

(51) Int. Cl.
*G06F 40/40* (2020.01)
*G06N 20/00* (2019.01)

(56) References Cited

U.S. PATENT DOCUMENTS

| | | | |
|---|---|---|---|
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec |
| 6,324,693 | B1 | 11/2001 | Brodersen et al. |
| 6,336,137 | B1 | 1/2002 | Lee et al. |
| D454,139 | S | 3/2002 | Feldcamp |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker et al. |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,289,976 | B2 | 10/2007 | Kihneman et al. |
| 7,340,411 | B2 | 3/2008 | Cook |
| 7,620,655 | B2 | 11/2009 | Larsson et al. |
| 11,132,504 | B1 * | 9/2021 | Mont-Reynaud ....... G06F 40/30 707/740 |
| 2001/0044791 | A1 | 11/2001 | Richter et al. |
| 2002/0022986 | A1 | 2/2002 | Coker et al. |
| 2002/0029161 | A1 | 3/2002 | Brodersen et al. |
| 2002/0029376 | A1 | 3/2002 | Ambrose et al. |
| 2002/0035577 | A1 | 3/2002 | Brodersen et al. |
| 2002/0042264 | A1 | 4/2002 | Kim |
| 2002/0042843 | A1 | 4/2002 | Diec |
| 2002/0072951 | A1 | 6/2002 | Lee et al. |
| 2002/0082892 | A1 | 6/2002 | Raffel et al. |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0152102 | A1 | 10/2002 | Brodersen et al. |
| 2002/0161734 | A1 | 10/2002 | Stauber et al. |
| 2002/0162090 | A1 | 10/2002 | Parnell et al. |
| 2002/0165742 | A1 | 11/2002 | Robins |
| 2003/0004971 | A1 | 1/2003 | Gong et al. |
| 2003/0018705 | A1 | 1/2003 | Chen et al. |
| 2003/0018830 | A1 | 1/2003 | Chen et al. |
| 2003/0066031 | A1 | 4/2003 | Laane |
| 2003/0066032 | A1 | 4/2003 | Ramachadran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker |
| 2003/0088545 | A1 | 5/2003 | Subramaniam et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec |
| 2003/0189600 | A1 | 10/2003 | Gune et al. |
| 2003/0191743 | A1 | 10/2003 | Brodersen et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan, Jr. et al. |
| 2004/0199489 | A1 | 10/2004 | Barnes-Leon et al. |
| 2004/0199536 | A1 | 10/2004 | Barnes-Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2009/0177744 | A1 | 7/2009 | Marlow et al. |
| 2014/0188862 | A1 * | 7/2014 | Campbell ......... G06F 16/24575 707/728 |
| 2014/0258303 | A1 * | 9/2014 | Gollapudi ............. G06F 16/951 707/740 |
| 2017/0278514 | A1 * | 9/2017 | Mathias .................. G06F 16/35 707/740 |
| 2019/0108282 | A1 * | 4/2019 | Zeng ...................... G06N 5/022 707/740 |

OTHER PUBLICATIONS

"Generating Sentences from Context-Free Grammars", http://www.nltk.org/howto/generate.html, Downloaded Apr. 27, 2020, 2 pages.
"Probabilistic Context Free Grammar (PCFG)", https://en.wikipedia.org/wiki/Probabilistic_context-free_grammar, Downloaded Apr. 7, 2020, 14 pages.
"Salesforce Object Query Language (SOQL)", https://developer.salesforce.com/docs/atlas.en-us.soql_sosl.meta/soql_sosl/sforce_api_calls_soql.htm, Downloaded Apr. 7, 2020, 2 pages.
{Probabilistic| Stochastic} Context-Free Grammars (PCFGs), 37 pages.
Collins, "Probabilistic Context-Free Grammars (PCFGs)", http://www.cs.columbia.edu/~mcollins/courses/nlp2011/notes/pcfgs.pdf, published 2011, 18 pages.
Lample, et al., "Neural Architectures for Named Entity Recognition", arXiv:1603.01360v3 [cs CL] Apr. 7, 2016, 11 pages.
Manning and Schutze, "Foundations of Statistical Natural Language Processing", Chapter 11: Probabilistic Context Free Grammars, Octoebr 20, 2001, 1 page.

(56) References Cited

OTHER PUBLICATIONS

Wei, "These are the Easiest Data Augmentation Techniques in Natural Language Processing You Can Think of—and They Work", Towards Data Science, https://towardsdatascience.com/these-are-the-easiest-data-augmentation-techniques-in-natural-language-processing-you-can-think-of-88e393fd610, Feb. 3, 2019, Downloaded Apr. 7, 2020, 7 pages.

* cited by examiner

MY RECENTLY VIEWED ENVIRO SCAN OPPORTUNITIES IN WIEN  502

| | |
|---|---|
| MY | B-UDD_MINE |
| RECENTLY | B-UDD_RECENT |
| VIEWED | I-UDD_RECENT |
| ENVIRO | B-ORG |
| SCAN | I-ORG |
| OPPORTUNITIES | B-UDD_OPP |
| IN | PREP |
| WIEN | B-LOC_CITY |

610

514

```
SELECT ID
   FROM OPPORTUNITY
USING SCOPE_MINE
WHERE
   LASTVIEWEDDATE<>NULL AND
   ACCOUNT.ID = '00101QKDVZAF'
AND
   ACCOUNT.SHIPPINGCITY = 'WIEN'
```

FIG. 11

GENERATING TRAINING DATA FOR NATURAL LANGUAGE SEARCH SYSTEMS

TECHNICAL FIELD

One or more implementations relate to natural language processing (NLP) systems, and more specifically to generating training data for natural language search systems in a cloud computing environment.

BACKGROUND

"Cloud computing" services provide shared resources, software, and information to computers and other devices upon request or on demand. Cloud computing typically involves the over-the-Internet provision of dynamically scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

Documents, files, and/or data may be stored in the cloud computing environment in one or more databases. Users commonly search a database for desired information. In some applications, a user is able to ask questions of the database (either by textual input or by voice commands) to get answers to queries. Using speech recognition, natural language understanding, and natural language processing, the applications parse the user's natural language utterances, determine meaning, and apply the query to the database to get the results. Applying the query to the database typically involves translating the natural language query to a form necessary to automatically access the database. In some cases, the query is translated to a structured query language (SQL) format. In some systems, a machine learning model learns the utterance-to-SQL mapping based on applying training data. Acquiring sufficient quantities of training data is problematic, especially (but not limited to) the first few product releases when there is insufficient user activity that can be logged and mined. This effort can also be challenging in an enterprise scenario where data privacy and security are additional requirements. Furthermore, modern deep learning systems used in natural language search systems require very large amounts of training data in order to be effective. Generating the training data individually or by crowdsourcing is time intensive.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

FIG. 11 is an example of a user query, a tagged user query, and SQL statements according to some embodiments.

DETAILED DESCRIPTION

Historically, the focus of developing search strategies for a database has been on traditional keyword search, where records in tables in the database are denormalized and then processed into a regular inverted index so they can be made available for search (e.g., basically, the traditional use case for a search engine searching over semi-structured data). Recent research has focused on gaining a deeper semantic understanding of search queries currently being sent to the database and to enable queries previously not possible or not served well by the database.

Natural language search is a feature of some applications that provides for querying an application using natural language utterances by a user. When the application is a database management system (DBMS), a natural language utterance, such as a query (e.g., "my Acme Corp. accounts in New York") is mapped by a natural language search system to a structured query language (SQL) statement that can be executed by the DBMS to interrogate the database and return the results.

To improve the performance of the natural language search system in mapping natural language user queries into SQL statements, the machine learning model of the natural language search system is trained by processing training data. Embodiments of the present invention solve the problem of efficiently generating large amounts of suitable training data on a massive scale in an automated way. It does so by automatically generating synthetic queries that can be made to be indistinguishable from expected spoken and/or written user queries. Embodiments of the present invention generate training data in a way that preserves security and privacy standards, even when leveraging organization specific data for generating queries in the specific domain of a target organization. Not only do embodiments generate the queries, but also all the expected labeled data associated with the queries, including labels for named entity recognition (NER), correct labels for resolution to identifiers (IDs) (e.g., entity resolution), and exact SQL interpretations.

Embodiments generate training data that can be used to train and also evaluate a natural language search system in an end-to-end fashion, or for training individual components of the natural language search system independently.

Figure 1A:
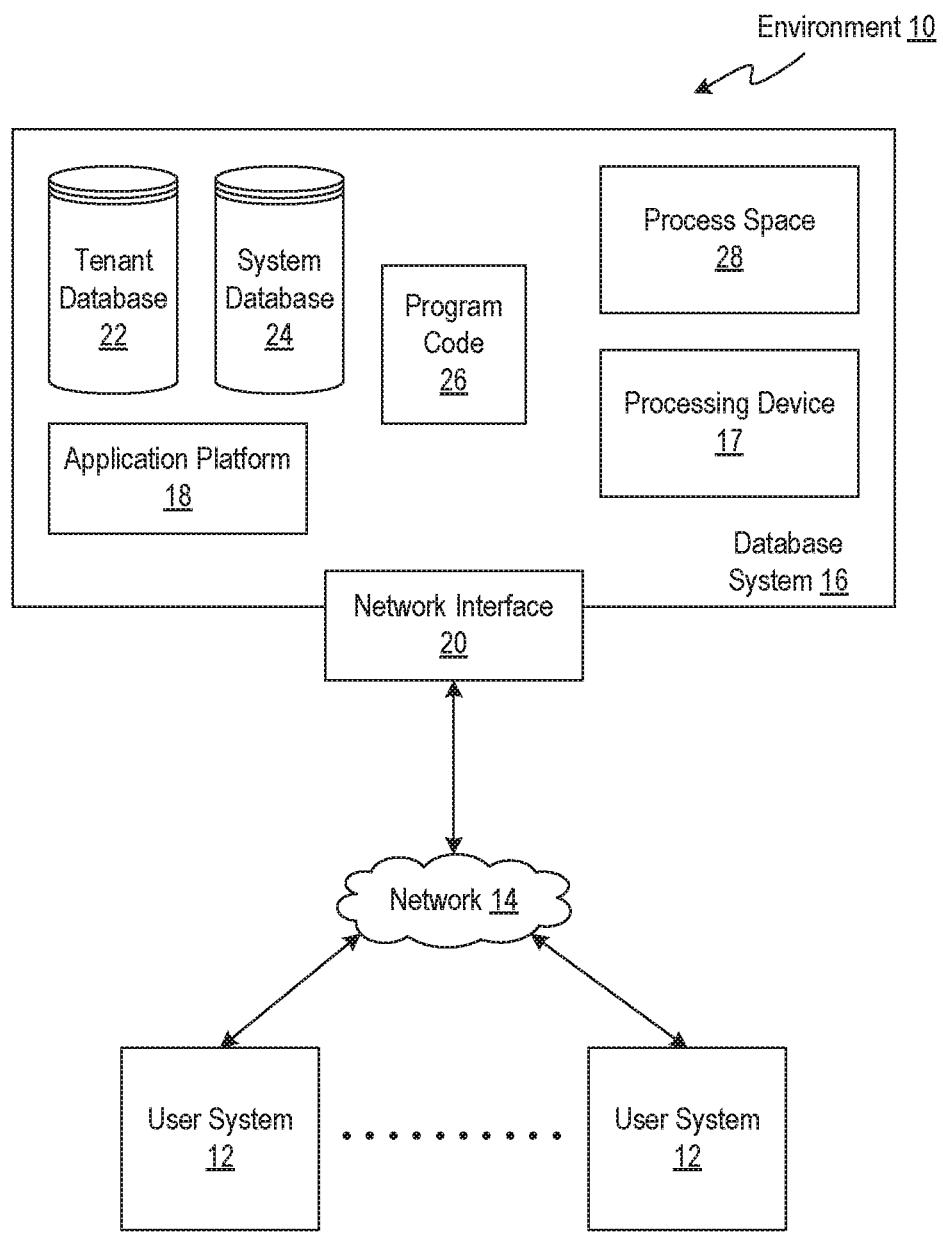
FIG. 1A illustrates an example computing environment of an on-demand database service according to some embodiments.

FIG. 1A illustrates a block diagram of an example of a cloud computing environment 10 in which an on-demand database service using a natural language search system can be used in accordance with some implementations. Environment 10 includes user systems 12 (e.g., customer's computing systems), a network 14, a database system 16 (also referred to herein as a "cloud-based system" or a "cloud computing system"), a processing device 17, an application platform 18, a network interface 20, a tenant database 22 for storing tenant data (such as data sets), a system database 24 for storing system data, program code 26 for implementing various functions of the database system 16 (including a visual data cleaning application), and process space 28 for executing database system processes and tenant-specific processes, such as running applications for customers as part of an application hosting service. In some other implementations, environment 10 may not have all these components or systems, or may have other components or systems instead of, or in addition to, those listed above. In some embodiments, tenant database 22 is a shared storage.

In some implementations, environment 10 is a computing environment in which an on-demand database service (including a natural language search system) exists. An on-demand database service, such as that which can be implemented using database system 16, is a service that is made available to users outside an enterprise (or enterprises) that owns, maintains, or provides access to database system 16. As described above, such users generally do not need to be concerned with building or maintaining database system 16. Instead, resources provided by database system 16 may be available for such users' use when the users need services provided by database system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a large number of customers, and a given database table may store rows of data for a potentially much larger number of customers. A database image can include one or more database objects. A relational database management system (RDBMS) or the equivalent can execute storage and retrieval of information against the database object(s).

Application platform 18 can be a framework that allows the applications of database system 16 to execute, such as the hardware or software infrastructure of database system 16. In some implementations, application platform 18 enables the creation, management and execution of one or more applications developed by the provider of the on-demand database service, users accessing the on-demand database service via user systems 12, or third-party application developers accessing the on-demand database service via user systems 12.

Figure 5:
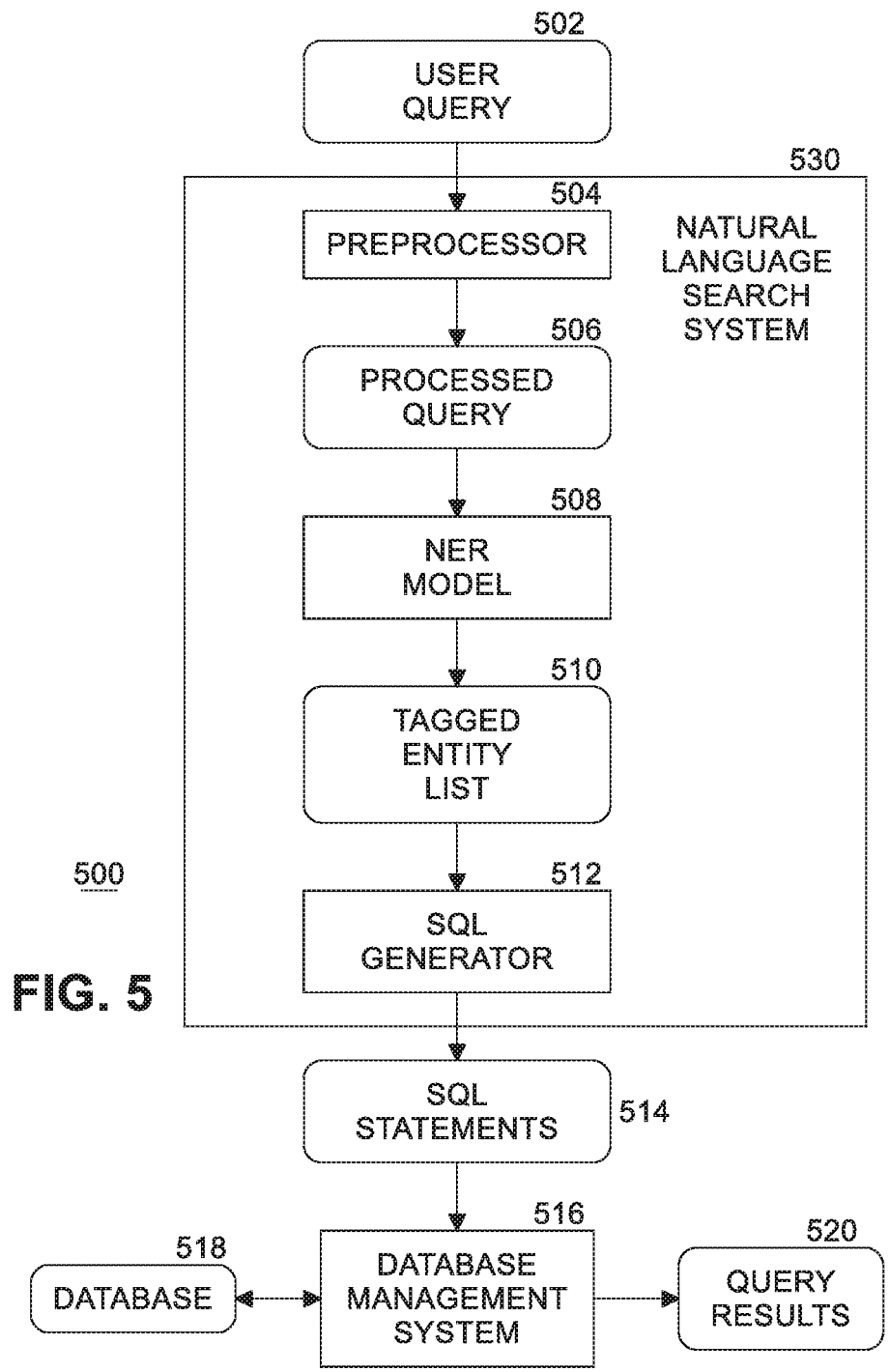
FIG. 5 is a diagram of an example natural language search system according to some embodiments.
Figure 6:
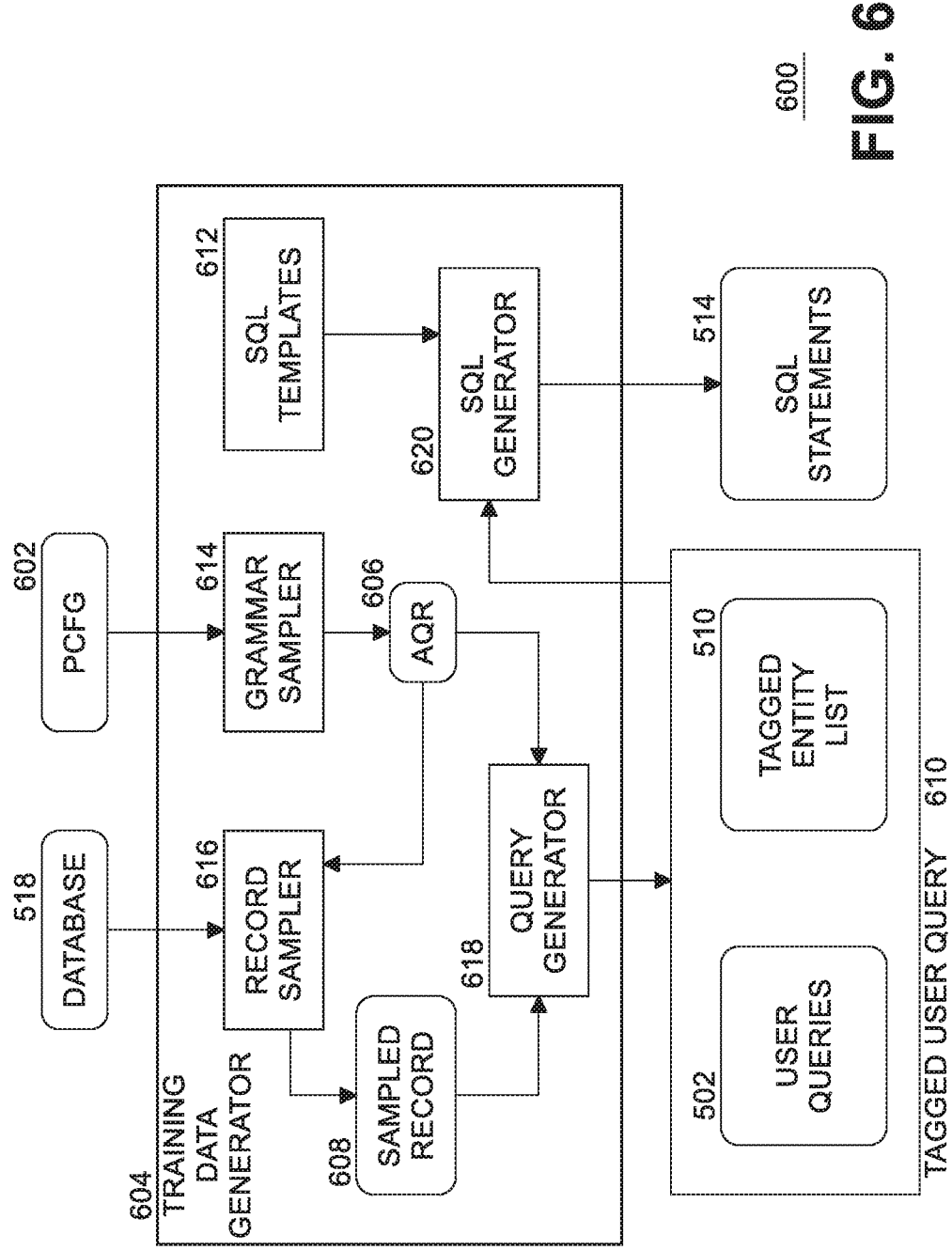
FIG. 6 is a diagram of an example training data generator system according to some embodiments.

In some embodiments, application platform 18 includes natural language search system 530 (as shown in FIG. 5 and described below) and/or training data generator system 600 (as shown in FIG. 6 and described below).

In some implementations, database system 16 implements a web-based customer relationship management (CRM) system. For example, in some such implementations, database system 16 includes application servers configured to implement and execute CRM software applications as well as provide related data, code, forms, renderable web pages, and documents and other information to and from user systems 12 and to store to, and retrieve from, a database system related data, objects, and World Wide Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. Database system 16 also implements applications other than, or in addition to, a CRM application. For example, database system 16 can provide tenant access to multiple hosted (standard and custom) applications, including a CRM application. User (or third-party developer) applications, which may or may not include CRM, may be supported by application platform 18. Application platform 18 manages the creation and storage of the applications into one or more database objects and the execution of the applications in one or more virtual machines in the process space of database system 16.

According to some implementations, each database system 16 is configured to provide web pages, forms, applications, data, and media content to user (client) systems 12 to support the access by user systems 12 as tenants of database system 16. As such, database system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application, such as an object-oriented database management system (OODBMS), a relational database management system (RDBMS), or an unstructured DB such as "noSQL" as is well known in the art. It should also be understood that "server system", "server", "server node", and "node" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

Network 14 can be or include any network or combination of networks of systems or devices that communicate with one another. For example, network 14 can be or include any one or any combination of a local area network (LAN), wide area network (WAN), telephone network, wireless network, cellular network, point-to-point network, star network, token ring network, hub network, or other appropriate configuration. Network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

User systems 12 (e.g., operated by customers) can communicate with database system 16 using TCP/IP and, at a higher network level, other common Internet protocols to communicate, such as the Hyper Text Transfer Protocol (HTTP), Hyper Text Transfer Protocol Secure (HTTPS), File Transfer Protocol (FTP), Apple File Service (AFS), Wireless Application Protocol (WAP), Secure Sockets layer (SSL) etc. In an example where HTTP is used, each user system 12 can include an HTTP client commonly referred to as a "web browser" or simply a "browser" for sending and receiving HTTP signals to and from an HTTP server of the database system 16. Such an HTTP server can be implemented as the sole network interface 20 between database system 16 and network 14, but other techniques can be used in addition to or instead of these techniques. In some implementations, network interface 20 between database system 16 and network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

User systems 12 can be implemented as any computing device(s) or other data processing apparatus or systems usable by users to access database system 16. For example, any of user systems 12 can be a desktop computer, a work station, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. When discussed in the context of a user, the terms "user system," "user device," and "user computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, Google's Chrome browser, or a WAP-enabled browser in the case of a cellular phone, personal digital assistant (PDA), or other wireless device, allowing a user (for example, a subscriber of on-demand services provided by database system 16) of user system 12 to access, process, and view information, pages, and applications available to it from database system 16 over network 14.

Each user system 12 also typically includes one or more user input devices, such as a keyboard, a microphone for capturing natural language utterances spoken by the user, a mouse, a trackball, a touch pad, a touch screen, a pen or stylus, or the like, for interacting with a graphical user interface (GUI) provided by the browser on a display (for example, a monitor screen, liquid crystal display (LCD), light-emitting diode (LED) display, etc.) of user system 12 in conjunction with pages, forms, applications, and other information provided by database system 16 or other systems or servers. For example, the user interface device can be used to access data and applications hosted database system 16, and to perform searches on stored data, or otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

In some cases, accessing the data includes the scenario where the user speaks or types one or more queries to be applied to the database system. For example, the user could say "my open accounts for this month in California" and the database system translates these natural language utterances of the user into one or more queries applied to the database to get the results of the user queries.

The users of user systems 12 may differ in their respective capacities, and the capacity of a particular user system 12 can be entirely determined by permissions (permission levels) for the current user of such user system. For example, where a salesperson is using a particular user system 12 to interact with database system 16 (perhaps by spoken natural language utterances), that user system can have the capacities allotted to the salesperson. However, while an administrator is using that user system 12 to interact with database system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU), such as a Core® processor commercially available from Intel Corporation or the like. Similarly, database system 16 (and additional instances of an MTS, where more than one is present) and all of its components can be operator-configurable using application(s) including computer code to run using processing device 17, which may be implemented to include a CPU, which may include an Intel Core® processor or the like, or multiple CPUs. Each CPU may have multiple processing cores.

Database system 16 includes non-transitory computer-readable storage media having instructions stored thereon that are executable by or used to program a server or other computing system (or collection of such servers or computing systems) to perform some of the implementation of processes described herein. For example, program code 26 can include instructions for operating and configuring database system 16 to intercommunicate and to process web pages, applications, and other data and media content as described herein. In some implementations, program code 26 can be downloadable and stored on a hard disk, but the entire program code, or portions thereof, also can be stored in any other volatile or non-volatile memory medium or device as is well known, such as a read-only memory (ROM) or random-access memory (RAM), or provided on any media capable of storing program code, such as any type of rotating media including floppy disks, optical discs, digital video discs (DVDs), compact discs (CDs), microdrives, magneto-optical discs, magnetic or optical cards, nanosystems (including molecular memory integrated circuits), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, virtual private network (VPN), local area network (LAN), etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known.

Figure 1B:
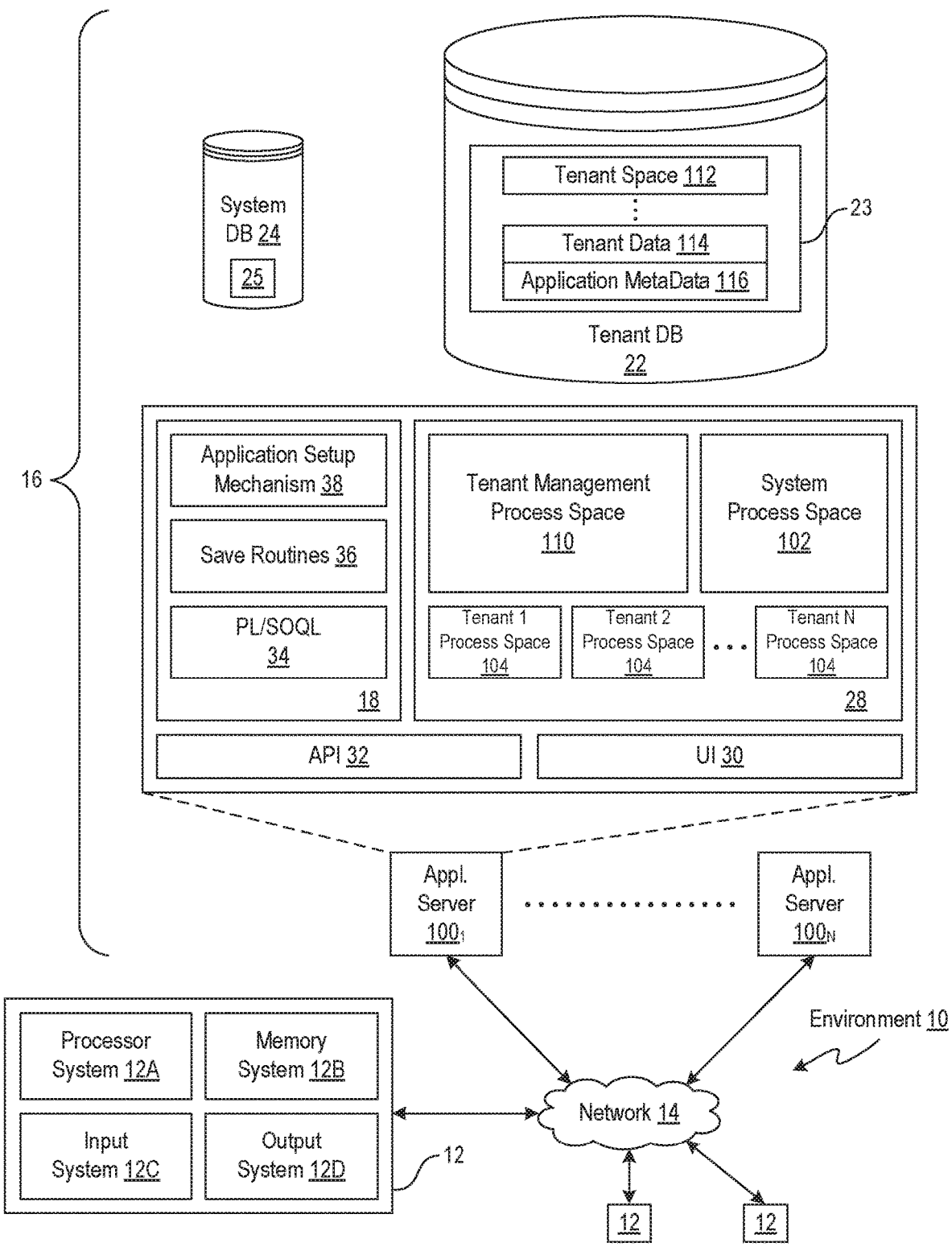
FIG. 1B illustrates example implementations of elements of FIG. 1A and example interconnections between these elements according to some embodiments.

FIG. 1B illustrates a block diagram of example implementations of elements of FIG. 1A and example interconnections between these elements according to some implementations. That is, FIG. 1B also illustrates environment 10, but in FIG. 1B, various elements of database system 16 and various interconnections between such elements are shown with more specificity according to some more specific implementations. In some implementations, database system 16 may not have the same elements as those described herein or may have other elements instead of, or in addition to, those described herein.

In FIG. 1B, user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, network interface 20 is implemented as a set of HTTP application servers $100_1$-$100_N$. Each application server 100, also referred to herein as an "app server," is configured to communicate with tenant database 22 and tenant data 23 stored therein, as well as system database 24 and system data 25 stored therein, to serve requests received from user systems 12. Tenant data 23 can be divided into individual tenant storage spaces 112, which can be physically or logically arranged or divided. Within each tenant storage space 112, tenant data 114 and application metadata 116 can similarly be allocated for each user. For example, a copy of a user's most recently used (MRU) items can be stored in tenant data 114. Similarly, a copy of MRU items for an entire organization that is a tenant can be stored to tenant space 112.

Database system 16 of FIG. 1B also includes a user interface (UI) 30 and an application programming interface (API) 32. Process space 28 includes system process space 102, individual tenant process spaces 104 and a tenant management process space 110. Application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process space 110, for example. Invocations to such applications can be coded using procedural language for structured query language (PL/SQL) 34, which provides a programming language style interface extension to the API 32. A detailed description of some PL/SQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, issued on Jun. 1, 2010, and hereby incorporated by reference herein in its entirety and for all purposes. Invocations to applications can be detected by one or more system processes, which manage retrieving application metadata 116 for the subscriber making the invocation and executing the metadata as an application in a virtual machine.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_2$ can be coupled via a direct network link, and another application server $100_N$ can be coupled by yet a different network connection. Transfer Control Protocol and Internet Protocol (TCP/IP) are examples of typical protocols that can be used for communicating between application servers 100 and database system 16. However, it will be apparent to one skilled in the art that other transport protocols can be used to optimize database system 16 depending on the network interconnections used.

In some implementations, each application server 100 is configured to handle requests (including spoken requests) for any user associated with any organization that is a tenant of database system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between application servers 100 and user systems 12 to distribute requests to application servers 100. In one implementation, the load balancer uses a least-connections algorithm to route user requests to application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, database system 16 can be a multi-tenant system in which database system 16 handles storage of, and access to, different objects, data, and applications across disparate users and organizations.

In some embodiments, at least one application server $100_1 \ldots 100_N$ includes natural language search system 530 (as shown in FIG. 5 and described below) and/or training data generator system 600 (as shown in FIG. 6 and described below).

In one example storage use case, one tenant can be a company that employs a sales force where each salesperson uses database system 16 to manage aspects of their sales. A user can maintain contact data, leads data, customer follow-up data, performance data, goals and progress data, etc., all applicable to that user's personal sales process (for example, in tenant database 22). In an example of an MTS arrangement, because all of the data and the applications to access, view, modify, report, transmit, calculate, etc., can be maintained and accessed by a user system 12 having little more than network access, the user can manage his or her sales efforts and cycles from any of many different user systems.

For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed database system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, database system 16 also can maintain system level data usable by multiple tenants or other data. Such system level data can include industry reports, news, postings, and the like that are sharable among tenants.

In some implementations, user systems 12 (which also can be client systems) communicate with application servers 100 to request (including in some instances spoken requests (e.g., natural language utterances)) and update system-level and tenant-level data from database system 16. Such requests and updates can involve sending one or more queries to tenant database 22 or system database 24. Database system 16 (for example, an application server 100 in database system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, issued on Aug. 17, 2010, and hereby incorporated by reference herein in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
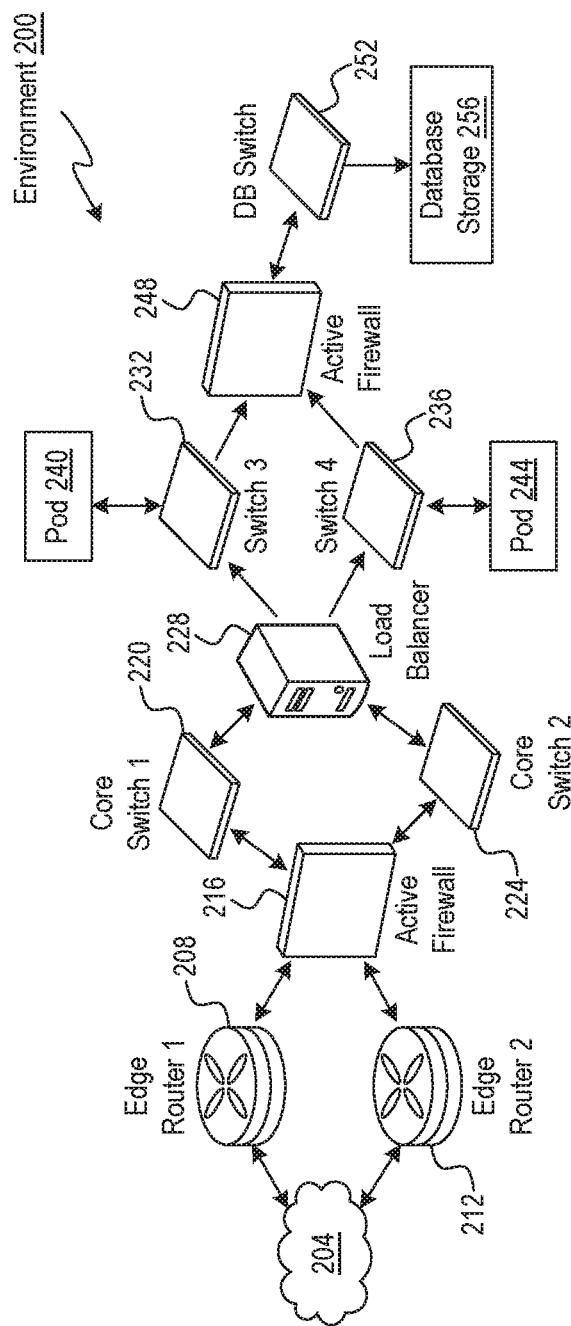
FIG. 2A illustrates example architectural components of an on-demand database service environment according to some embodiments.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. Pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
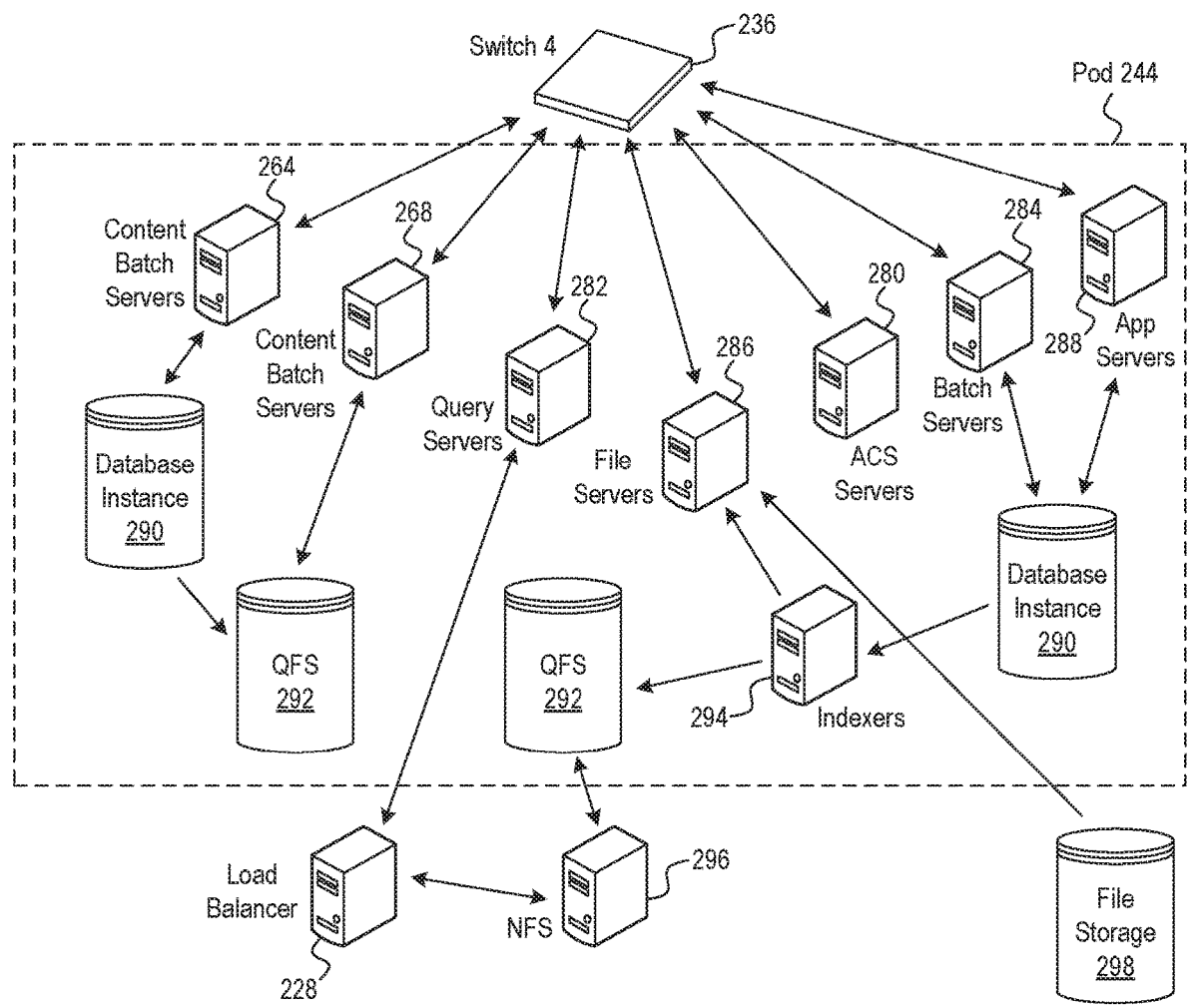
FIG. 2B illustrates example architectural components of an on-demand database service environment according to some embodiments.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to many devices of each type. Also, the on-demand database service environment need not include each device shown in FIGS. 2A and 2B or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server," "device," and "processing device" as used herein are not limited to a single hardware device; rather, references to these terms can include any suitable combination of hardware and software configured to provide the described functionality.

Cloud 204 is intended to refer to a data network or multiple data networks, often including the Internet. Client machines communicably connected with cloud 204 can communicate with other components of the on-demand database service environment 200 to access services provided by the on-demand database service environment. For example, client machines can access the on-demand database service environment to retrieve, store, edit, or process information. In some implementations, edge routers 208 and 212 route packets between cloud 204 and other components of the on-demand database service environment 200. For example, edge routers 208 and 212 can employ the Border Gateway Protocol (BGP). The BGP is the core routing protocol of the Internet. Edge routers 208 and 212 can maintain a table of Internet Protocol (IP) networks or 'prefixes,' which designate network reachability among autonomous systems on the Internet.

In some implementations, firewall 216 can protect the inner components of the on-demand database service environment 200 from Internet traffic. Firewall 216 can block, permit, or deny access to the inner components of on-demand database service environment 200 based upon a set of rules and other criteria. Firewall 216 can act as one or more of a packet filter, an application gateway, a stateful filter, a proxy server, or any other type of firewall.

In some implementations, core switches 220 and 224 are high-capacity switches that transfer packets within the on-demand database service environment 200. Core switches 220 and 224 can be configured as network bridges that quickly route data between different components within the on-demand database service environment. In some implementations, the use of two or more core switches 220 and 224 can provide redundancy or reduced latency.

In some implementations, pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between pods 240 and 244 is conducted via pod switches 232 and 236. Pod switches 232 and 236 can facilitate communication between pods 240 and 244 and client machines communicably connected with cloud 204, for example, via core switches 220 and 224. Also, pod switches 232 and 236 may facilitate communication between pods 240 and 244 and database storage 256. In some implementations, load balancer 228 can distribute workload between pods 240 and 244. Balancing the on-demand service requests between the pods can assist in improving the use of resources, increasing throughput, reducing response times, or reducing overhead. Load balancer 228 may include multilayer switches to analyze and forward traffic.

In some implementations, access to database storage 256 is guarded by a database firewall 248. Database firewall 248 can act as a computer application firewall operating at the database application layer of a protocol stack. Database firewall 248 can protect database storage 256 from application attacks such as SQL injection, database rootkits, and unauthorized information disclosure. In some implementations, database firewall 248 includes a host using one or more forms of reverse proxy services to proxy traffic before passing it to a gateway router. Database firewall 248 can inspect the contents of database traffic and block certain content or database requests. Database firewall 248 can work on the SQL application level atop the TCP/IP stack, managing applications' connection to the database or SQL management interfaces as well as intercepting and enforcing packets traveling to or from a database network or application interface.

In some implementations, communication with database storage 256 is conducted via database switch 252. Multi-tenant database storage 256 can include more than one hardware or software components for handling database queries. Accordingly, database switch 252 can direct database queries transmitted by other components of the on-demand database service environment (for example, pods 240 and 244) to the correct components within database storage 256. In some implementations, database storage 256 is an on-demand database system shared by many different organizations as described above with reference to FIGS. 1A and 1B.

FIG. 2B shows a system diagram further illustrating example architectural components of an on-demand database service environment according to some implementations. Pod 244 can be used to render services to a user of on-demand database service environment 200. In some implementations, each pod includes a variety of servers or other systems. Pod 244 includes one or more content batch servers 264, content search servers 268, query servers 282, file servers 286, access control system (ACS) servers 280, batch servers 284, and app servers 288. Pod 244 also can include database instances 290, quick file systems (QFS) 292, and indexers 294. In some implementations, some or all communication between the servers in pod 244 can be transmitted via pod switch 236.

In some implementations, app servers 288 include a hardware or software framework dedicated to the execution of procedures (for example, programs, routines, scripts) for supporting the construction of applications provided by on-demand database service environment 200 via pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

In an embodiment, one or more of natural language search system 530 and training data generator system 600, as described below, are executed by app servers 288.

Content batch servers 264 can handle requests internal to the pod. Some such requests can be long-running or not tied to a particular customer. For example, content batch servers 264 can handle requests related to log mining, cleanup work, and maintenance tasks. Content search servers 268 can provide query and indexer functions. For example, the functions provided by content search servers 268 can allow users to search through content stored in the on-demand database service environment. File servers 286 can manage requests for information stored in file storage 298. File storage 298 can store information such as documents, images, and binary large objects (BLOBs). In some embodiments, file storage 298 is a shared storage. By managing requests for information using file servers 286, the image footprint on the database can be reduced. Query servers 282 can be used to retrieve information from one or more file systems. For example, query servers 282 can receive requests for information from app servers 288 and transmit information queries to network file systems (NFS) 296 located outside the pod.

Pod 244 can share a database instance 290 configured as a multi-tenant environment in which different organizations share access to the same database. Additionally, services rendered by pod 244 may call upon various hardware or software resources. In some implementations, ACS servers 280 control access to data, hardware resources, or software resources. In some implementations, batch servers 284 process batch jobs, which are used to run tasks at specified times. For example, batch servers 284 can transmit instructions to other servers, such as app servers 288, to trigger the batch jobs.

In some implementations, QFS 292 is an open source file system available from Sun Microsystems, Inc. The QFS can serve as a rapid-access file system for storing and accessing information available within the pod 244. QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in NFS 296 or other storage systems.

In some implementations, one or more query servers 282 communicate with the NFS 296 to retrieve or update information stored outside of the pod 244. NFS 296 can allow servers located in pod 244 to access information to access files over a network in a manner similar to how local storage is accessed. In some implementations, queries from query servers 282 are transmitted to NFS 296 via load balancer 228, which can distribute resource requests over various resources available in the on-demand database service environment. NFS 296 also can communicate with QFS 292 to update the information stored on NFS 296 or to provide information to QFS 292 for use by servers located within pod 244.

In some implementations, the pod includes one or more database instances 290. Database instance 290 can transmit information to QFS 292. When information is transmitted to the QFS, it can be available for use by servers within pod 244 without using an additional database call. In some implementations, database information is transmitted to indexer 294. Indexer 294 can provide an index of information available in database instance 290 or QFS 292. The index information can be provided to file servers 286 or QFS 292. In some embodiments, there may be a plurality of database instances stored and accessed throughout the system. In some embodiments, user requests are received to restore at least a portion of one or more database instances 290 from a backup store (e.g., files in file storage 298).

Figure 3:
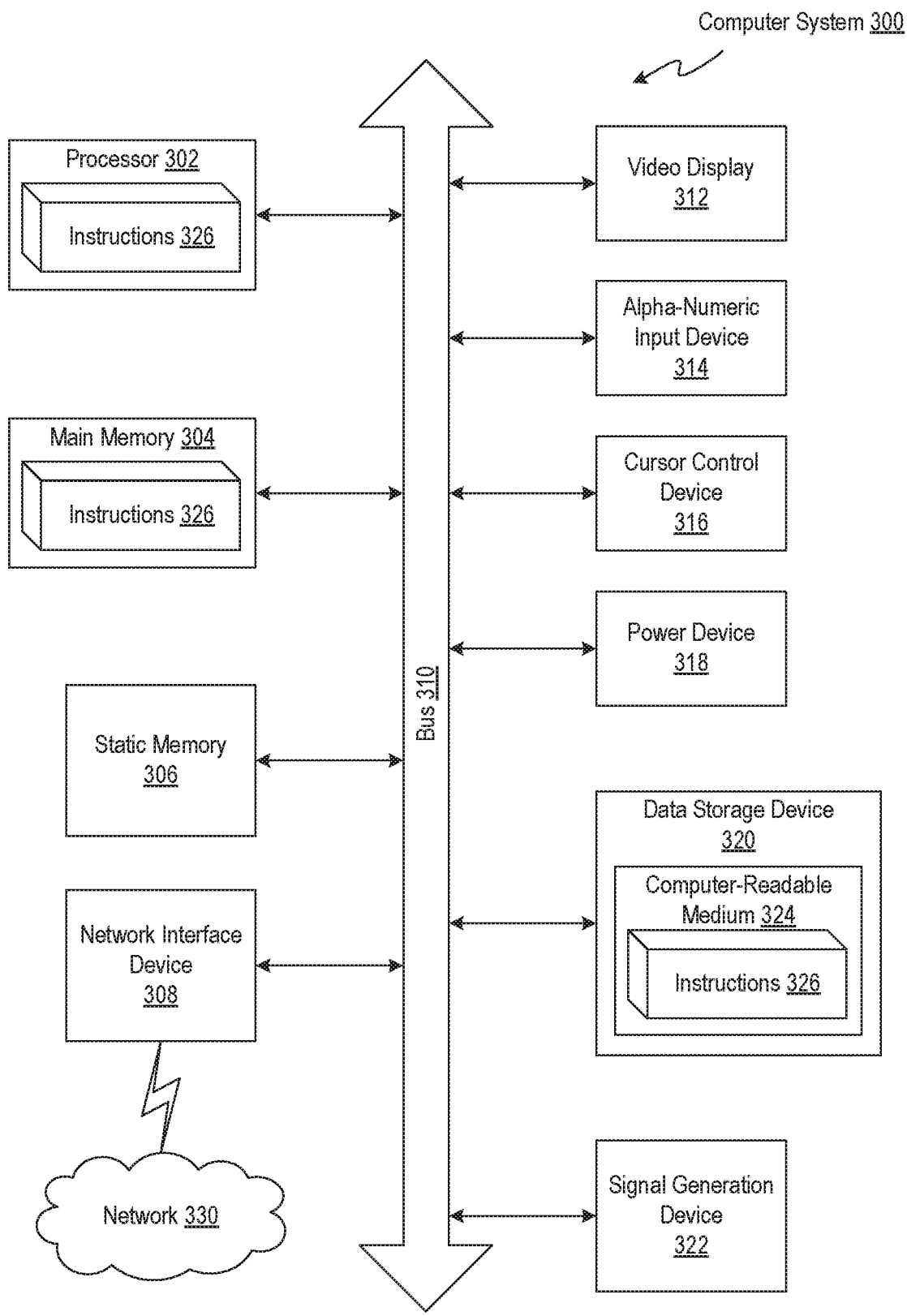
FIG. 3 is a diagrammatic representation of a machine in the exemplary form of a computer system within which one or more embodiments may be carried out.

FIG. 3 illustrates a diagrammatic representation of a machine in the exemplary form of a computer system 300 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 300 may be utilized by or illustrative of any of the electronic components described herein (e.g., any of the components illustrated in or described with respect to FIGS. 1A, 1B, 2A, and 2B).

The exemplary computer system 300 includes a processing device (processor) 302, a main memory 304 (e.g., ROM, flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 320, which communicate with each other via a bus 310.

Processor 302 represents one or more general-purpose processing devices such as a microprocessor, central processing unit, or the like. More particularly, processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 302 may also be one or more special-purpose processing devices such as an application specific integrated circuit (ASIC), a field programmable gate array (FPGA), a digital signal processor (DSP), network processor, or the like. Processor 302 is configured to execute instructions 326 for performing the operations and steps discussed herein. Processor 302 may have one or more processing cores.

Computer system 300 may further include a network interface device 308. Computer system 300 also may include a video display unit 312 (e.g., a liquid crystal display (LCD), a cathode ray tube (CRT), or a touch screen), an alphanumeric input device 314 (e.g., a keyboard), a cursor control device 316 (e.g., a mouse or touch screen), a signal generation device 322 (e.g., a loud speaker), and a microphone (not shown).

Power device 318 may monitor a power level of a battery used to power computer system 300 or one or more of its components. Power device 318 may provide one or more interfaces to provide an indication of a power level, a time window remaining prior to shutdown of computer system 300 or one or more of its components, a power consumption rate, an indicator of whether computer system is utilizing an external power source or battery power, and other power related information. In some implementations, indications related to power device 318 may be accessible remotely (e.g., accessible to a remote back-up management module via a network connection). In some implementations, a battery utilized by power device 318 may be an uninterruptable power supply (UPS) local to or remote from computer system 300. In such implementations, power device 318 may provide information about a power level of the UPS.

Data storage device 320 may include a tangible computer-readable storage medium 324 (e.g., a non-transitory computer-readable storage medium) on which is stored one or more sets of instructions 326 (e.g., software) embodying any one or more of the methodologies or functions described herein. Instructions 326 may also reside, completely or at least partially, within main memory 304 and/or within processor 302 during execution thereof by computer system 300, main memory 304, and processor 302 also constituting computer-readable storage media. Instructions 326 may further be transmitted or received over a network 330 (e.g., network 14) via network interface device 308.

In one implementation, instructions 326 include instructions for performing any of the implementations of natural language search system 530 and/or training data generator system 600 as described herein. While computer-readable storage medium 324 is shown in an exemplary implementation to be a single medium, it is to be understood that computer-readable storage medium 324 may include a single medium or multiple media (e.g., a centralized or distributed database, and/or associated caches and servers) that store the one or more sets of instructions.

Embodiments of the present invention generate training data for a natural language search system. First, a probabilistic context free grammar (PCFG) is defined and used to produce all the queries that the grammar can produce. To produce such queries, embodiments of the present invention leverage data in a database from a given organization. Embodiments access database records of the organization and necessary fields from the database entity being queried. This can also be used to generate queries with picklist values, in whatever combinations are allowed by the grammar.

In various embodiments, the PCFG is written by a human or is induced from data. Initially, when the database system is in development prior to a first release there are few user generated queries, so the PCFG is written by human. Once the database system has been responding to a large number of user queries, the PCFG can be induced from a selected set of existing user queries and results data. The induced PCFG can be compared to the initial "hand-crafted" PCFG to detect any differences. In an embodiment, the PCFG having the best performance according to predetermined criteria can be selected for use in the database system. In an embodiment, the PCFG is improved over time using additional user queries.

The queries produced have all the information necessary to generate the exact SQL query statement associated with objects relevant to the query (such as record identifier (ID), picklist values, correct disambiguation, etc.). This realistic training data can then be used to train a named entity recognition (NER) model for natural language search processing (or more generally, a sequence tagger, since not all of the entities tagged by the NER have to be named entities). In addition, data augmentation techniques can be used to add noise in a calculated way to the synthetic queries to make the NER model more robust. Examples of data augmentation techniques include varying capitalization (most queries are in lower casing, sometimes copy/pasted), variations on names of companies, introduction of misspellings, grammatical variations that the system will target, stratified sampling for long/short/complex queries, injecting salespeople jargon keywords, etc.

In embodiments, if the training data generator system has authorized access to logs and organization data in a secure cloud computing environment, the training data generator system can run without ever exposing user data to a human, thereby satisfying common privacy and security requirements. The training data generator system can output training and/or evaluation statistics at the level of the grammar rules (e.g., organization independent), which can then be analyzed by a human (e.g., a system administrator), but the human is not exposed to the underlying user data.

Embodiments of the present invention precisely generate the correct SQL statements from synthetic queries because the training data generator system works backwards from the answer to the query. Having a correct SQL statement implies that the training data generator system can resolve named entities to the correct IDs for those named entities in the database. For example, in the translation of a query to an SQL statement, getting the mapping of synthetic query account information to IDs is often one of the most challenging parts to a general solution.

Figure 4:
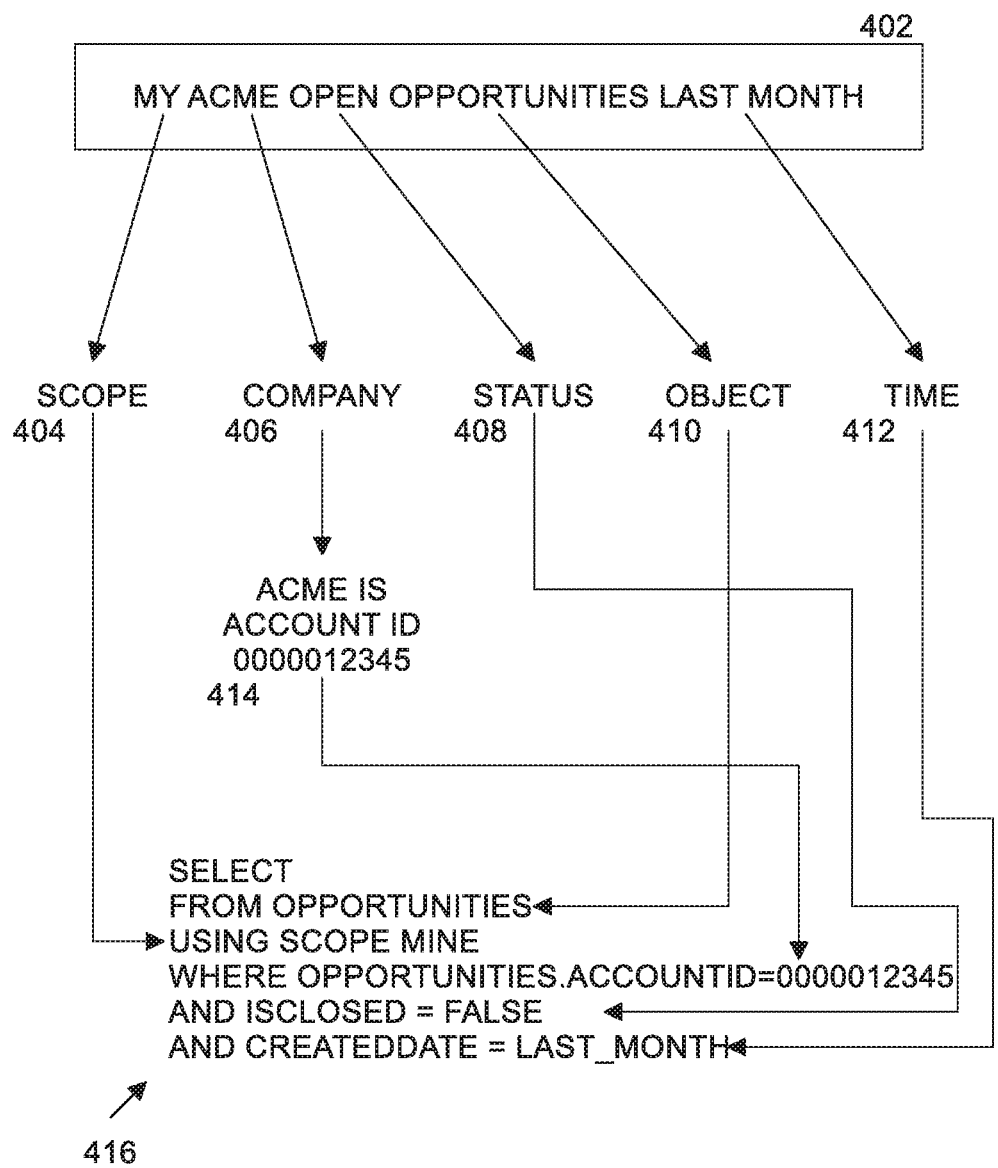
FIG. 4 is a diagram of an example of a query according to some embodiments.

FIG. 4 is a diagram of an example of a conceptual query according to some embodiments. In this example, user query 402 is received by a natural language search system. In one embodiment, the query is spoken by a user (e.g., the query is an audible natural language utterance). In this example, the query is the phrase "my Acme open opportunities last month." This implies that the user would like to query the database to obtain a list of the open sales opportunities for Acme from last month for the user. Understanding the intent of the user query is a goal of the natural language search system. In one embodiment, the natural language search system parses the query to identify likely concepts. For example, the concepts of scope 404, company 406, status 408, object 410, and time 412 may be identified. The natural language search system attempts to resolve concepts to specific records in the database. For example, a company 406 field for "Acme" may be resolved to a specific account ID for Acme (e.g., account ID 0000012345) 414. The natural language search system translates the concepts into SQL statements 416 that can be applied to the database to generate results of the query.

FIG. 5 is a diagram of an example natural language search system according to some embodiments. Overall system 500 includes a database 518 (such as tenant database 22 of FIG. 1 and/or database instance 290 of FIG. 2), a database management system 516 (such as application platform 18 and/or database system 16 of FIG. 1) to access database 518, and natural language search system 530. In an embodiment, natural language search system 530 is executed by application platform 18 of FIG. 1A and/or by application servers $100_1$-$100_N$ of FIG. 1B. In another embodiment, natural language system 530 is executed by one or more of batch servers 284, content batch servers 264, and app servers 288 of FIG. 2B. User query 502, embodied as a natural language utterance, is input to natural language search system 530. Natural language search system 530 processes the user query to generate one or more SQL statements 514. SQL statements 514 are input to database management system 516 to query database 518. Query results 520 are then returned. Thus, application of the spoken user query 502 to database 518 produces query results 520.

In an embodiment, natural language search system 530 includes multiple components. Preprocessor 504 accepts user query 504, parses the query, and applies preprocessing logic that includes: tokenization, segmentation, spelling corrections, lower-casing, language identification, and so on. For example, preprocessor 504 may translate a query such as "(my) high value! marcus steele cases in san francisco . . . " into a translated query such as "my high value marcus steele cases in San Francisco." The result of preprocessor 504 processing is processed query 506.

Named entity recognition (NER) model 508 reads the processed query and generates tagged entity list 510. In one embodiment, NER model 508 is a model based on the paper "Neural Architectures for Named Entity Recognition" by Guillaume Lampe, Miguel Ballesteros, Sandeep Subramanian, Kazuya Kawakami, and Chris Dyer, published Apr. 7, 2016, for which there is an open source implementation and a visualization for the NER model being applied to an example query on the Internet at Github. (github.com Hironsan anago ("/" delimiters for the uniform resource locator (URL) have been replaced by blanks)). In other embodiments, other suitable NER models may be used.

SQL generator 512 reads the tagged entity list, resolves one or more tags from the tagged entity list (such as account ID), and generates SQL statements 514 representing user query 502.

To improve the performance of NER model 508, it is desirable to train the NER model on large amounts of user queries. Generally, the more user queries the NER model processes, the better the performance of the NER model. However, generating large amounts of user queries by traditional methods is inefficient and very time consuming. Embodiments of the present invention generate user queries 502 and corresponding SQL statements 514 that are used to train and evaluate NER model 508.

FIG. 6 is a diagram of an example training data generator system 600 according to some embodiments. In an embodiment, training data generator system 600 is executed by application platform 18 of FIG. 1A and/or by application servers $100_1$-$100_N$ of FIG. 1B. In another embodiment, training data generator system 600 is executed by one or more of batch servers 284, content batch servers 264, and app servers 288 of FIG. 2B. Training data generator system 600 includes training data generator 604. Training data generator 604 comprises logic implemented in software, hardware, firmware, or a combination to analyze probabilistic context-free grammar (PCFG) 602 and selected records from database 518 to produce one or more user queries 502 (represented in textual form, not audio), tagged entity list 510, and SQL statements 514.

PCFG 602 is a Context-Free Grammar (CFG) with probabilities assigned to the rules such that the sum of all probabilities for all rules expanding the same non-terminal is equal to one. PCFGs are described in "Probabilistic Context Free Grammars (PCFGs)" by Michael Collins, 2011, and "Probabilistic|Stochastic Context Free Grammars (PCFGs)" by Christopher D. Manning and Heinrich Schütze, Chapter 11, in "Foundations of Statistical Natural Language Processing," Oct. 20, 2001.

In one embodiment of the present invention, the grammar rules in PCFG 602 are crafted manually by the system developer. This can typically be done for small and even medium domains, however this approach can be hard to scale for large domains, where a more automated approach is necessary. Automated approaches for grammar induction usually require having lots of training data which is one of the problems being addressed. While a general grammar of English would contain many rules for covering the entire language, domain-specific natural language search systems can be served well with fewer rules that are higher-level than a general grammar (examples of such systems include systems that allow for querying for directions, or systems that allow for queries within the context of a customer relationship management (CRM) system). Such restricted, conceptual grammars are referred to as semantic grammars.

One approach is to bootstrap the system with a manually crafted semantic grammar, and then after having generated enough training data, to switch to an approach that leverages the generated data to induce a more comprehensive grammar in an automated fashion. Such methods for automatically inducing grammars are not discussed further herein.

Here is an example of a simplified PCFG:

randomly chooses one of the grammar's S→ . . . rules, with a probability proportional to the rule's weight. Grammar sampler 614 takes a grammar as input (e.g., PCFG 602) and performs a given number of repeated expansions on the S symbol. Thus, grammar sampler 614 generates one or more sentences from PCFG 602 that are represented herein as AQR 606 510.

In an embodiment, record sampler 616 samples one or more records 608 from a target table of database 612 using AQR 606. Query generator 618 replaces tokens (e.g., tagged entities) from the grammar sentence represented by AQR 606 with values from the sampled record(s) 608 to generate user query 502 and tagged entity list 510. As used herein, a tagged user query 610 comprises the tagged entity list 510 and the user query. 502 SQL generator 620 translates tagged user query 610 into one or more SQL statements 514 using tagged user query 610.

Figure 7:
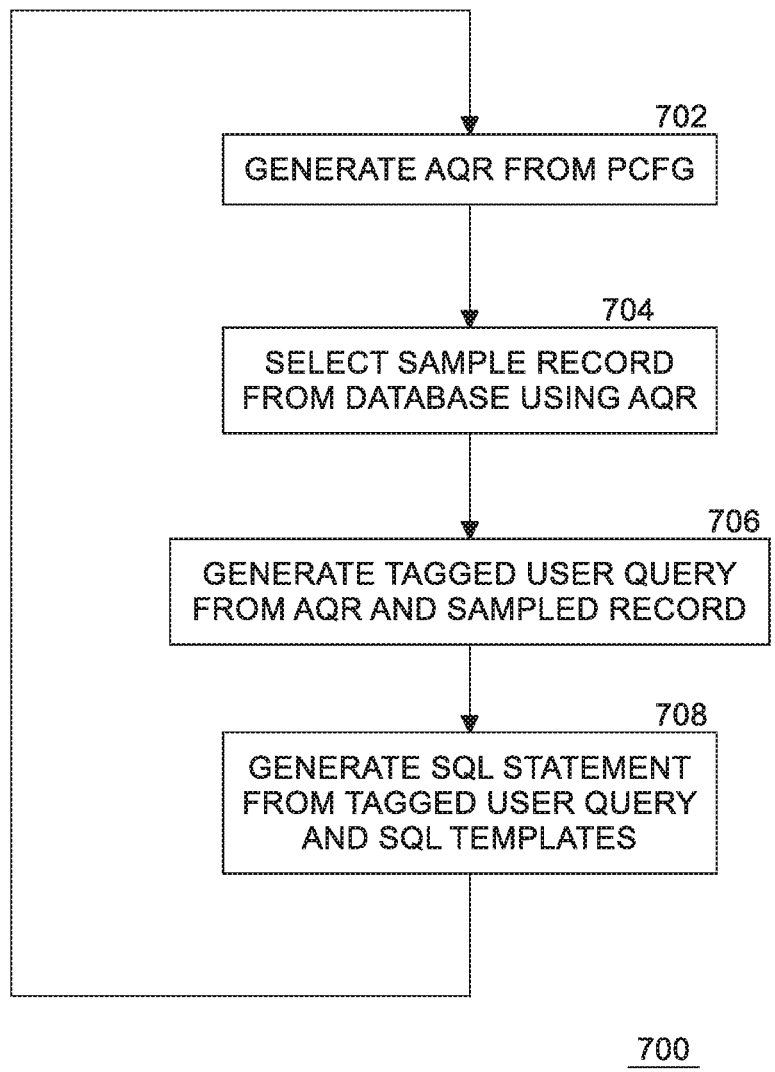
FIG. 7 is a flow diagram of an example process of generating training data according to some embodiments.

FIG. 7 is a flow diagram of an example process 700 of generating training data by training data generator 604 according to some embodiments. At block 702, training data generator 604 generates an AQR 606 from PCFG 602. In an embodiment, grammar sampler 614 performs a top-down expansion of the PCFG's semantic structure by traversing the PCFG and sampling non-terminals based on the probabilities specified in the PCFG. In one embodiment this is performed by applying a beam search process to generate plausible sentences of abstract queries. Beam search is a heuristic search algorithm that explores a graph by expanding the most promising node in a limited set. Beam search is an optimization of best-first search that reduces its memory requirements. Best-first search is a graph search which orders all partial solutions (states) according to some heuristic. But in beam search, only a predetermined number of best partial solutions are kept as candidates. A beam width of 1 would generate trees according to the induced/crafted probabilities. The beam width is used as a lever to control the likelihood of various trees. A higher beam width skews the distribution towards more probable trees (e.g., a higher likelihood) whereas a lower beam width would bring the distribution closer to the PCFG distribution.

In an embodiment, generating AQR 606 is performed in a manner similar to what is described in "Generating Sentences from Context-Free Grammars" available on the Internet at "http: www nitk org howto generate.html" ("/" delimiters for the uniform resource locator (URL) have been replaced by blanks). In an embodiment, training data gen-

```
S -> PRE ENTITY POST [1.0]
PRE -> NULL [0.5] | SCOPE SC_FLTR [0.5]
ENTITY -> UDD_ACC [0.2] | UDD_OPP [0.2] | UDD_LEAD [0.2] | UDD_CONTACT [0.2] |
UDD_CASE [0.2]
POST -> NULL [0.34] | TIME LOC_PH [0.33] | LOC TIME_PH [0.33]
SCOPE -> UDD_TEAM [0.5] | UDD_MINE [0.5]
SC_FLTR -> FILTERS [0.2] | PER FILTERS [0.2] | FILTERS PER [0.2] |ORG FILTERS [0.2] |
FILTERS ORG [0.2]
FILTERS -> NULL [0.2] | PLS [0.2] | BOOL_EXPR [0.2] | PLS BOOL_EXPR [0.2] |
BOOL_EXPR PLS [0.2]
LOC_PH -> NULL [0.5] | LOC [0.5]
TIME_PH -> NULL [0.5] | TIME [0.5]
```

Example output data from this simplified PCFG is an abstract query representation (AQR) 606 such as 'UDD_TEAM PICKLIST PER UDD_CASE LOC TIME.'

In an embodiment, generation of an AQR 606 is just repeated symbol expansion. To expand a symbol such as S or PRE, grammar sampler 614 of training data generator 604 erator 604 starts with the non-terminal S (or sentences, also known as the user query). Then, with equal probability 0.5, the "PRE" component will either be NULL or will be a SCOPE followed by a SC_FILTER. Based on a random number generator, one is selected, e.g., SCOPE SC_FILTER. For SCOPE, there are only two options, UDD_TEAM or UDD_MINE, one of these is selected and processing moves to the next one, and so on.

The P in PCFG 603 is the addition of probabilities to each of the right-hand-side of each production rule, which allows for including variability into the system. So, in the present case, the rule:

S→PRE ENTITY POST [1.0]
PRE→NULL [0.5]|SCOPE SC_FILTER [0.5]
Is the same as:
S→NULL ENTITY POST [0.5]
S→SCOPE SC_FILTER ENTITY POST [0.5]

Which means that half of the sentences would have the first form and the other half would have the second form, or if the following probabilities were shown:

S→NULL ENTITY POST [0.3]
S→SCOPE SC_FILTER ENTITY POST [0.7]

It would mean that 30% of the sentences/queries would have the first form and 70% of them would have the second form. The probabilities described here can be leveraged to change the distribution of various forms to suit the needs of the system and when necessary to mimic actual user query traffic characteristics.

Figure 8:
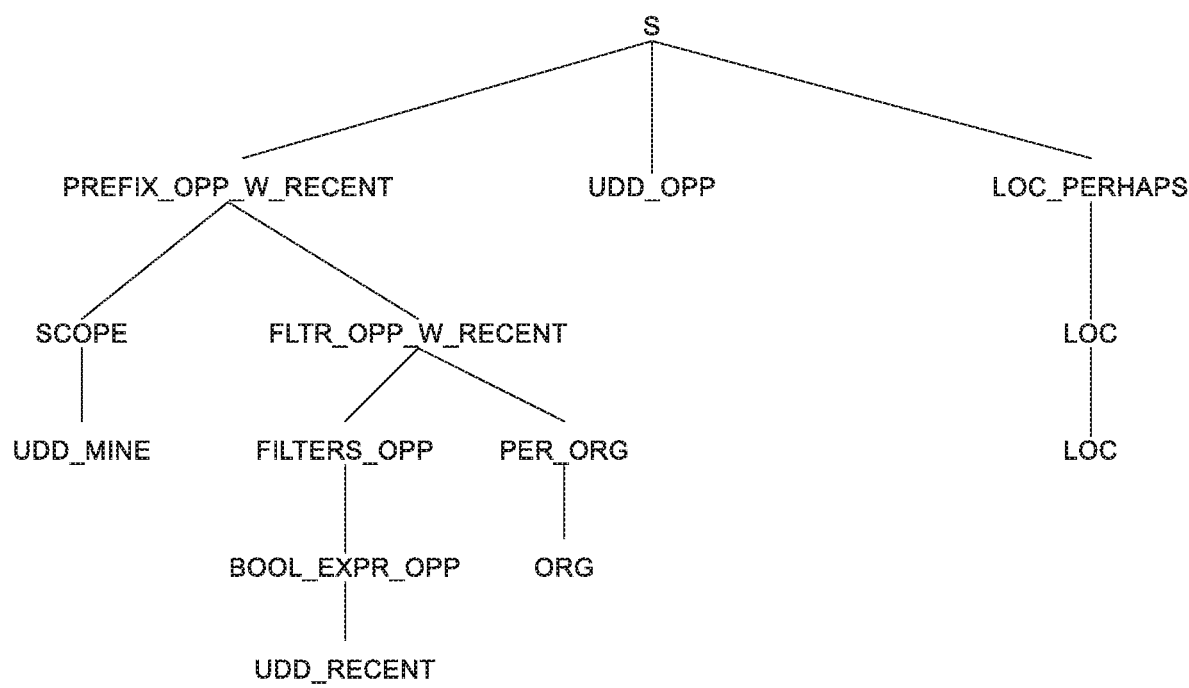
FIG. 8 is an example abstract query representation (AQR) generated according to some embodiments.

FIG. 8 is an example abstract query representation 606 generated according to some embodiments.

Turning back to FIG. 7, at block 704 record sampler 616 of training data generator 604 selects a sample record 608 from database 612. In some embodiments, record sampler 616 gets selected tables from the database (e.g., target tables) and identifies fields of those tables as possible objects that a query may reference.

One way to select records would be to sample uniformly from a target table after the target table has been filtered down to a set of satisfactory records. However, given that there is noise in the databases, in an embodiment filtering logic is applied before records are selected uniformly. In this embodiment, records are select uniformly from a set of "good" records in the database. In this embodiment, "good" records include those records that have high selectivity, in other words, if there are 30 records with the company name "coca-cola", then that would add unnecessary ambiguity into the system, so records are selected that have less ambiguity. In another example, some records have noise tokens added to certain fields, like a company name such as "Nike, eastern region, test test, do not use". This is an example of customers adding extraneous information to the company name field, which may happen often in some cases, so embodiments filter out records that include the "do not use" string. Records are also selected that tend to get clicked often by users, which presumably means that the data is cleaner for those records.

At block 706, query generator 618 of training data generator 604 generates tagged user query 610 (including user queries 502 and tagged entity list 510) from AQR 606 and one or more sampled records 608. In an embodiment, query generator 618 performs a lookup operation for every semantic token (e.g., tagged entity) in the generated sentence (e.g., tagged entity list 510). The lookup operation is performed against the sampled record 608 and a curated vocabulary to find values for each of the semantic tokens. Each semantic token has a custom procedure/function defined which performs the lookup operation from the record value or the curated vocabulary to return a phrase corresponding to the semantic token. All the phrases are assembled together to arrive at the synthetically generated user query 502.

Figure 9:
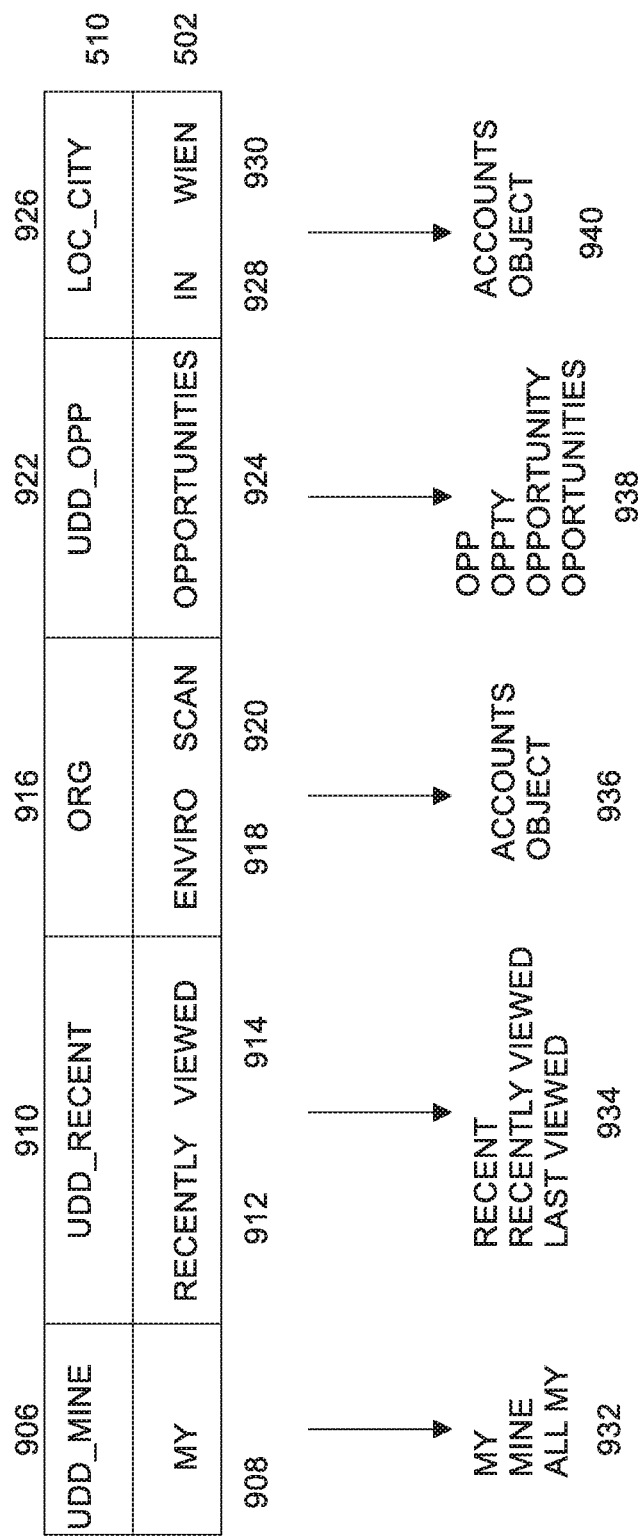
FIG. 9 is an example of translating an abstract query representation to a tagged user query according to some embodiments.

FIG. 9 is an example of translating an abstract query representation to a tagged user query according to some embodiments. An example of a tagged entity list 510 generated at block 706 is UDD_MINE 906, UDD_RECENT 910, ORG 916, UDD_OPP 922, and LOC_CITY 926. Each of the tags in tagged entity list 510 is translated by training data generator 604 into a portion of user query 502. For example, tag UDD_MINE 906 is translated into "my" 908, tag UDD_RECENT 910 is translated into "recently viewed" 924, 914, ORG 916 is translated into "Enviro Scan" 918, 920, UDD_OPP is translated into "opportunities" 924, and LOC_CITY 926 is translated into "in Wien" 928, 930. In some embodiments, training data generator 604 may also translate each tag into one or more variants to become part of one or more user queries. For example, in addition to translating UDD_MINE 906 to "my" 908, training data generator 604 translates UDD_MINE 906 into "mine" and "all mine" 932, since "mine" and "all mine" are variants of "my." Similarly, "recent" and "last viewed" 934 may be generated as variants of "recently viewed"; "accounts object" 936 is generated as a variant of "Enviro Scan", "opp", "oppty", "opportunity" and "opportunities" 938 (note the misspelling) may be generated as variants of "opportunities"; and "accounts object" 940 may be generated as a variant of "in Wien". Thus, training data generator 604 generates one or more user queries 502 based at least in part on tagged entity list 510 generated at block 706.

Turning back to FIG. 7, at block 708 SQL generator 620 of training data generator 604 generates one or more SQL statements 514 using tagged user query 610 and SQL templates 612. In an embodiment, instead of SQL statements, SQL generator 620 translates tagged user query 610 into one or more Salesforce Object Query Language (SOQL) statements. SOQL is similar to the widely used SELECT statement in SQL but is designed specifically for data in the format of a database commercially available for Salesforce.com, Inc. In an embodiment, SQL translator 620 translates the tagged user query 610 (using the context provided by the semantic sentence) into an SQL statement 514. This is done by pattern matching against a set of pre-defined SQL statement templates 612 (initially created by the system developer). Each semantic token is associated with a corresponding template. Some templates are static and are not associated with any record field identifiers, whereas others form filters in the SQL statement 514 with record field names, operators and associated values. A generic template ID is of the form: "<record field name><operator><record field value>". For example, "ACCOUNT.ID='00101QKDVAF'". An example of a static SQL template 512 for UDD_MINE is "USING SCOPE_MINE."

Figure 10:
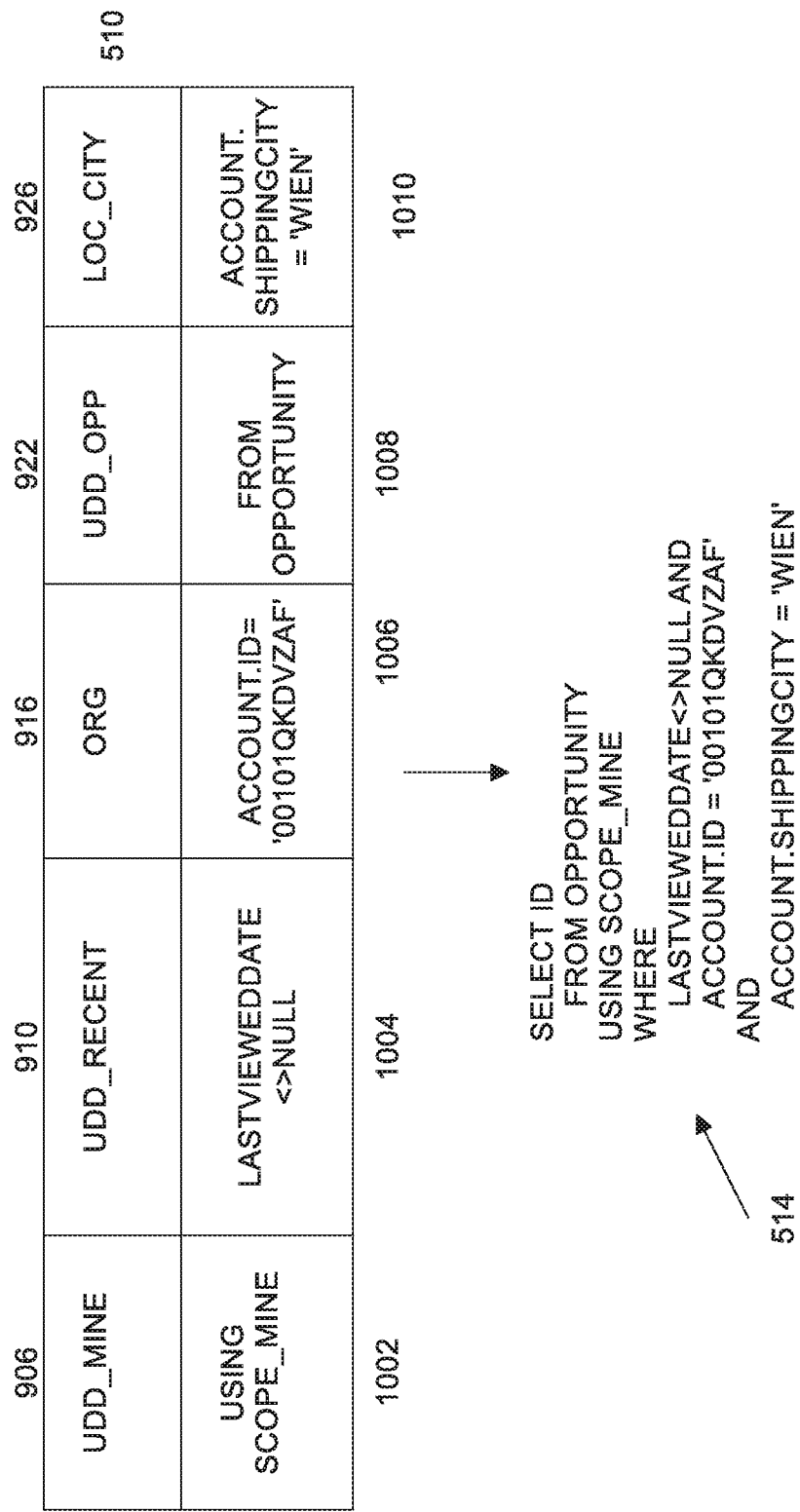
FIG. 10 is an example of translating a tagged user query to a structured query language (SQL) statement according to some embodiments.

FIG. 10 is an example of translating a tagged user query 610 to one or more structured query language (SQL) statements 514 according to some embodiments. An example of a tagged entity list 510 generated at block 706 is UDD_MINE 906, UDD_RECENT 910, ORG 916, UDD_OPP 922, and LOC_CITY 926. Each of the tags in tagged entity list 510 is translated by training data generator 604 into a portion of one or more SQL statements 514. For example, tag UDD_MINE 906 is translated into SQL statement "USING SCOPE_MINE" 1002, tag UDD_RECENT 910 is translated into SQL statement "LASTVIEWEDDATE < >NULL" 1004, tag ORG 916 is translated into SQL statement "ACCOUNT.ID='00101QKDVAF'" 1006, tag UDD_OPP 922 is translated into SQL statement "FROM OPPORTUNITY" 1008, and tag LOC_CITY 926 is translated into SQL statement "ACCOUNT.SHIPPINGCITY='WIEN'" 1010. The translated SQL statements 514 taken together and applied to database 518 retrieve query results 520.

Turning back to FIG. 7, once block 708 is complete, processing loops back to block 702. This process can be repeated any number of times to generate additional user queries 502, tagged entity lists 510 (collectively tagged user query 610), and associated SQL statements 514 based at least in part on PCFG 602 and database 518. The generated user queries 502 and SQL statements 514 are stored in a file to be applied to NER model 508 for improved learning for the NER model.

FIG. 11 is an example of an abstract query representation 606, a tagged user query 610, and SQL statements 514 according to some embodiments. Training data generator 604 thus associates user queries 502 to NER tags in tagged entity list 510 and to SQL statements 514 based on PCFG 602 and database 518. These data structures can be applied to NER model 508 to improve the performance of the NER model and to also provide a basis for evaluation of the NER model.

The NER model can be evaluated by switching out the database of records with another alternative database or holding out records from the database in the training data generator system. An objective is to evaluate the NER model on queries the NER model has not processed before. The tagged entity list and the queries for this held out dataset are obtained. The set of generated queries from these held out records are passed through the NER model and the output is compared to the tagged entity list previously generated by the training data generator 604. This process automates the evaluation of the NER model using tagged user query 610 and SQL statements 514. This form of evaluation allows for checking the NER model's performance across all tenants in the MTS without explicitly looking at any of the queries generated, which upholds our security standards.

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which a computing environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM, and the like without departing from the scope of the implementations claimed. Moreover, the implementations are applicable to other systems and environments including, but not limited to, client-server models, mobile technology and devices, wearable devices, and on-demand services.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™, or Python using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system and may be among other computer-readable media within a system or network. A computer system, or other computing device, may include a monitor, printer, or other suitable display for providing any of the results mentioned herein to a user.

The disclosure also relates to apparatuses, devices, and system adapted/configured to perform the operations herein. The apparatuses, devices, and systems may be specially constructed for their required purposes, may be selectively activated or reconfigured by a computer program, or some combination thereof.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A computer-implemented method comprising:
generating, by a training data generator, an abstract query representation from a probabilistic context-free grammar (PCFG), the PCFG having a set of rules to which probabilities are assigned, wherein generating the abstract query representation includes performing a top-down expansion of a semantic structure of the PCFG by traversing the PCFG and sampling non-terminals based on the assigned probabilities, wherein generating an abstract query representation includes applying a beam search process;
selecting, by the training data generator, a sample record from a database using the abstract query representation;
generating, by the training data generator, a tagged user query from the abstract query representation and the sample record by replacing tokens of the abstract query representation with one or more values from the sample record;
generating, by the training data generator, one or more structured query language (SQL) statements from the tagged user query and one or more SQL templates;
generating, by the training data generator, the tagged user query by replacing tokens of the abstract query representation with one or more values from the sample record;
incorporating, by the training data generator, variants into the tagged user query, the variants including misspellings; and
performing, by the training data generator, a lookup operation for every token of the abstract query representation against the sample record to find one or more values for each token and assembling the one or more values as the tagged user query.

2. The computer-implemented method of claim 1, comprising:
applying the tagged user query to a natural language search system, including a named entity recognition (NER) model, to train the NER model.

3. The computer-implemented method of claim 1, comprising:
generating the abstract query representation by repeated symbol expansion.

4. The computer-implemented method of claim 1, comprising: selecting the sample record from a target table of the database.

5. The computer-implemented method of claim 1, comprising:
generating the one or more SQL statements by pattern matching the tagged user query against the one or more SQL templates.

6. A tangible, non-transitory computer-readable storage medium having instructions stored thereon which, when executed by a processing device, cause the processing device to:

generate, by a training data generator, an abstract query representation from a probabilistic context-free grammar (PCFG), the PCFG having a set of rules to which probabilities are assigned, wherein generating the abstract query representation includes performing a top-down expansion of a semantic structure of the PCFG by traversing the PCFG and sampling non-terminals based on the assigned probabilities, wherein generating an abstract query representation includes applying a beam search process;

select, by the training data generator, a sample record from a database using the abstract query representation;

generate, by the training data generator, a tagged user query from the abstract query representation and the sample record by replacing tokens of the abstract query representation with one or more values from the sample record;

generate, by the training data generator, one or more structured query language (SQL) statements from the tagged user query and one or more SQL templates;

incorporating, by the training data generator, variants into the tagged user query, the variants including misspellings; and perform, by the training data generator, a lookup operation for every token of the abstract query representation against the sample record to find one or more values for each token and assemble the one or more values as the tagged user query.

7. The tangible, non-transitory computer-readable storage medium of claim 6 having instructions stored thereon which, when executed by a processing device, cause the processing device to generate the abstract query representation by repeated symbol expansion.

8. The tangible, non-transitory computer-readable storage medium of claim 6 having instructions stored thereon which, when executed by a processing device, cause the processing device to generate the one or more SQL statements by pattern matching the tagged user query against the one or more SQL templates.

9. A system comprising:
one or more servers, the servers configurable to cause:
generating, by a training data generator, an abstract query representation from a probabilistic context-free grammar (PCFG), the PCFG having a set of rules to which probabilities are assigned, wherein generating the abstract query representation includes performing a top-down expansion of a semantic structure of the PCFG by traversing the PCFG and sampling non-terminals based on the assigned probabilities, wherein generating an abstract query representation includes applying a beam search process;
selecting, by the training data generator, a sample record from a database using the abstract query representation;
generating, by the training data generator, a tagged user query from the abstract query representation and the sample record by replacing tokens of the abstract query representation with one or more values from the sample record;
generating, by the training data generator, one or more structured query language (SQL) statements from the tagged user query and one or more SQL templates; and
introducing, by the training data generator, variants into the tagged user query, the variants including misspellings;
performing, by the training data generator, a lookup operation for every token of the abstract query representation against the sample record to find one or more values for each token and assembling the one or more values as the tagged user query.

10. The system of claim 9, the servers further configurable to cause generating the one or more SQL statements by pattern matching the tagged user query against the SQL templates.

\* \* \* \* \*